INVENTOR
William E. Uffner
by Staelin and Overman
Att'ys

United States Patent Office 3,707,399
Patented Dec. 26, 1972

---

3,707,399
GLASS FIBER REINFORCED ELASTOMERS
William E. Uffner, Newark, Ohio, assignor to Owens-Corning Fiberglas Corporation
Filed Apr. 23, 1971, Ser. No. 136,698
Int. Cl. C03c 25/02
U.S. Cl. 117—72
21 Claims

ABSTRACT OF THE DISCLOSURE

This invention is addressed to the improvement in the bonding relationship of glass fibers with elastomeric materials in which the glass fibers are coated, or glass fiber bundles are impregnated, with a composition containing resorcinol-aldehyde resin, a butadiene-styrene-vinyl pyridine terpolymer, a copolymer containing at least 60% vinylidene chloride and an incompatible wax.

---

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as styrene, nitriles, acrylics and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitrile copolymers, butadiene-styrene-vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of moisture on the glass fiber surfaces which serves to destroy any bond, chemical or physical, which would otherwise be formed between the glass fiber surfaces and the elastomeric material with which the glass fibers are combined.

To minimize the problems of binding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

One such composition which can be used in the treatment of individual glass fibers or bundles of glass fibers as outlined above is described in application Ser. No. 595,036, filed Nov. 17, 1966, now Pat. No. 3,567,671, in which description is made of a treating composition formulated to include a resorcinol-aldehyde resin, a butadiene-styrene-vinyl pyridine terpolymer, a latex component in the form of a latex of a copolymer of vinyl chloride and vinylidene chloride and an incompatible wax. While the composition described in the foregoing application represents a significant improvement in the enhancement of the bonding relationship of glass fibers with elastomeric materials, it has been found that fibers treated with such compositions lose their tensile strength and adhesion characteristics on storage of the treated glass fibers under conditions of high humidity.

It is accordingly an object of the present invention to provide an improved composition for treating individual glass fibers, or preferably for treating bundles of glass fibers to promote the bonding relationship of glass fibers with elastomeric materials in the manufacture of glass fiber-reinforced elastomeric products.

It is a related object of the invention to produce coated glass fibers and impregnated glass fiber bundles for use as reinforcement for elastomeric materials which are characterized by improved adhesion and tensile characteristics, particularly after storage under high humidity conditions.

These and other objects and advantages of the invention will appear more fully hereinafter, and, for purposes of illustration, but not of limitation, embodiments of the invention are shown in the accompanying drawing in which.

Figure 1:
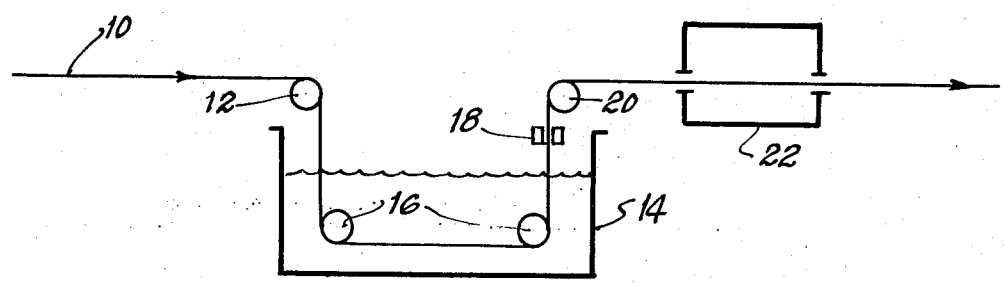
FIG. 1 is a schematic illustration of one method for the impregnation of a bundle of glass fibers in accordance with the preferred practice of the invention.

The concepts of the present invention reside in an improved treating composition formulated to include, as the essential ingredients, a resorcinol-aldehyde resin, a butadiene-styrene-vinyl pyridine terpolymer, an incompatible wax and a copolymer containing at least 60% by weight, and preferably 75% to 98% by weight, vinylidene chloride. It has been unexpectedly found that the use of a vinylidene chloride copolymer containing at least 60% by weight vinylidene chloride results in treated glass fibers having significantly improved tensile and adhesion characteristics as compared to fibers treated with the compositions described in the foregoing application containing the vinyl chloride-vinylidene chloride described therein, a copolymer of 80% by weight vinyl chloride and 20% by weight vinylidene chloride.

Without limiting the present invention as to theory, it is believed that the improved results obtained through the use of a copolymer containing at least 60% vinylidene chloride as the chlorinated component of the composition of the invention stems at least in part from the fact that such copolymers containing the vinylidene group

in the polymeric matrix is more susceptible to thermal oxidation, scission and/or dehydrochlorination than the corresponding vinyl group

with the result that the vinylidene chloride copolymer undergoes a greater degree of cross-linking by reason of complex free radical mechanisms initiated on heating the treated glass fibers.

As indicated above, use is made of a copolymer containing at least 60% by weight vinylidene chloride. For this purpose, use can be made of copolymers of vinylidene chloride with one or more monomers, such as alkyl acrylates or methacrylates in which the alkyl group contains 1 to 8 carbon atoms (e.g., methyl acrylate, ethyl acrylate, propyl acrylate), acrylonitrile, vinyl chloride as well as other ethylenically unsaturated monomers. Preferred copolymers for use in the present invention include Daran 212 from Dewey and Almy which is a copolymer formed of about 96% by weight vinylidene chloride and about 4% by weight butyl acrylate, or its lubricant modified form sold under the designation Daran X66919M, Dow latex XD4643 which is a copolymer formed of about 80% vinylidene chloride, about 15% by weight acrylonitrile and about 5% by weight alkyl acrylate, and Dow latex 4624 which is a copolymer formed of about 75% by weight vinylidene chloride, about 20% by weight vinyl chloride and about 5% by weight alkyl acrylate.

Such vinylidene chloride copolymer systems are most frequently available in the form of a latex and it is therefore generally preferred to formulate such copolymers into the treating composition of this invention in the form of a latex. For best results, use is preferably made of an amount of the latex to provide a solids content of the vinylidene chloride copolymer in the overall composition within the range of 15 to 40% by weight, and preferably 20 to 30% by weight.

The resorcinol-aldehyde component of the composition of this invention contributes materially to the adhesion of the resulting composition to the perfectly smooth, non-porous hydrophilic glass fiber surfaces, and is preferably a resin formed by reaction of the resorcinol with a lower aliphatic aldehyde containing 1–3 carbon atoms, such as formaldehyde, acetaldehyde and propionaldehyde. Preferred resins for use in the present invention are resorcinol-formaldehyde resins which are formed by the condensation reaction of formaldehyde with resorcinol in a mole ratio of about 2 moles of resorcinol to 1 mole of formaldehyde. Suitable resins are commercially available, for example, Penacolite R2170 from the Koppers Company in the form of a solution containing 75% solids. In general, use is preferably made of an amount of resorcinol-aldehyde resin to provide resorcinol-formaldehyde resin solids within the range of 2–10% by weight, and preferably within the range of 4–8% by weight.

As the butadiene-styrene-vinyl pyridine terpolymer, use can be made of a number of such terpolymers which are well known to those skilled in the art. Such terpolymers frequently contain about 70% by weight butadiene, 15% by weight styrene and about 15% by weight vinyl pyridine, although these proportions can be varied and are not critical to the practice of this invention. Representative of suitable butadiene-styrene-vinyl pyridine terpolymers include the terpolymers available from the Goodyear Tire and Rubber Company under the trade name "Pliolite VP100" and a number of terpolymers available from the General Tire and Chemical Company under the trade name "Gentac." For example, use can be made of "Gentac FS" which is a terpolymer having a comparatively low Mooney viscosity within the range of 35–45, although use is preferably made of "Gentac 107" which is a terpolymer having a higher Mooney viscosity, generally within the range of 110–120. It has been found that generally superior results have been obtained with the use of "Gentac 107" since the higher Mooney viscosity of the material contributes characteristics of improved toughness to the resulting treated glass fibers.

The terpolymer component is generally employed in an amount sufficient to provide from 20–60% by weight, and preferably 35–50% by weight, of the terpolymer in the treating composition on a solids basis.

The butadiene-styrene-vinyl pyridine terpolymer, the copolymer containing at least 60% by weight vinylidene chloride and the resorcinol-formaldehyde resin are all compatible each with the other, and operate to coat the fibers and fill the interstices between the fibers when applied as an impregnant in a glass fiber bundle whereby the fibers making up the bundle are capable of realignment in the direction of stress for maximizing the high strength properties of the impregnated bundle. These components are also somewhat compatible with the elastomeric materials forming the continuous phase of a glass fiber-elastomeric product to thereby permit glass fibers treated in accordance with the present invention to be blended with such elastomeric materials for advancement to a cured or vulcanized stage whereby the treating material from the glass fiber bundles is an integral part of the elastomeric phase to intertie the treated glass fibers to the elastomeric material.

The incompatible wax component of the present invention is preferably a micro-crystalline paraffinic wax of the type described in the aforementioned copending application, and without limiting the present invention as to theory, it is believed that the wax serves at least a limited function as a rubber softener. The wax is normally employed in an amount in excess of that capable of remaining compatible with the solids makeup of the remainder of the treating composition whereby the wax component sweats out for concentration on the surfaces of the treated glass fibers or glass fiber bundles to provide a non-tacky surface and thereby permit treated glass fibers to be processed into yarns, threads, cords or fabrics, and/or to be wound onto and unwound from spools without scissure or binding notwithstanding the elastomeric component with which the fibers are treated. Thus, the glass fibers can be treated with a composition that enhances good adhesion to the surfaces of glass fibers without interfering with the subsequent processing characteristics of the glass fibers and which also contains the necessary components to facilitate the bonding relationship between the glass fiber surfaces and the elastomeric material in the manufacture of glass fiber-reinforced elastomeric products.

The wax preferred for use in the present invention is a micro-crystalline paraffinic wax having a melting point within the range of 145–150° F., and sold under the designation "Vultex Wax Emulsion No. 9" by the General Latex and Chemical Corp. As will be appreciated by those skilled in the art, other paraffinic micro-crystalline waxes having the described characteristics can be employed in the practice of this invention in lieu of or in addition to the Vultex wax specifically described. The amount of the wax component can be varied within the range of 5–25% by weight, and preferably 8–20% by weight, of the solids of the treating composition.

Having described the basic concepts of the invention, reference is now made to the following examples, which are provided by way of illustration, and not by way of limitation, of the practice of the invention of treating bundles of glass fibers by impregnation or coating individual glass fibers for subsequent use in combination with elastomeric materials in the manufacture of glass fiber-reinforced elastomeric products. As indicated above, in the preferred practice of this invention, glass fibers in the form of a strand of a plurality of glass fiber filaments or in the form of a cord composed of strands of glass fibers plied together, with one or more of the strands forming the cord being twisted, are impregnated with the composition of the invention. An impregnating composition representative of the practice of this invention is represented by the following.

EXAMPLE 1

Part A

| | Parts by wt. |
|---|---|
| Deionized water | 732 |
| Sodium hydroxide | 1 |
| Resorcinol-formaldehyde polymer in the form of a latex containing 75% solids (Penacolite R2170) | 48 |
| Formaline (37% formaldehyde) | 16 |

Part B

| | Parts by wt. |
|---|---|
| Butadiene-styrene-vinyl pyridine terpolymer (42% solids) | 900 |
| Ammonium hydroxide | 80 |

Part C

| | Parts by wt. |
|---|---|
| Water | 200 |
| Ammonium hydroxide | 15 |
| Copolymer latex formed of 80% vinylidene chloride, 15% acrylonitrile and 5% alkylacrylate (Dow latex XD4643—50% by wt. solids) | 350 |
| Micro-crystalline paraffin wax (melting point 145–150° F.)-Vultex Wax Emulsion No. 9 of General Latex and Chemical Corp. 56% solids) | 200 |

Part A of the foregoing example is separately prepared by combining the ingredients and aging the resulting mixture for about 2–3 hours with the alkali present to adjust the pH to between 7 and 7.5. The remainder of the ingredients are then combined and the various parts are mixed together. However, it will be appreciated that variations in the order of mixing can be carried out to provide a stable system, depending somewhat upon the nature of the components and the relative amounts employed. It has been found that aging of the entire mixture is not essential, although best results are generally obtained when the resulting composition is aged for 10–24 hours or even longer prior to use in impregnating glass fiber bundles.

Impregnation with the aqueous composition prepared in accordance with Example 1 can be carried out by way of any of a variety of known techniques for the impregnation of glass fiber bundles. Referring specifically to FIG. 1 of the drawing, a strand 10 formed of a plurality of glass fibers which have preferably, although not necessarily, been sized in forming, is passed over a guide roller 12 for passage downwardly into an impregnating bath 14 containing the aqueous impregnating composition of Example 1. The bundle is then passed under a pair of rollers 16 to effect a sharp bend in the bundle which operates to open the bundle to facilitate more complete penetration of the aqueous treating composition in the bundle of glass fibers for complete impregnation of the bundle. The impregnated bundle is then raised from the bath for passage through a roller or die 18 which operates to remove excess treating composition from the bundle and to work the treating composition into the bundle. Thereafter, the endless bundle is advanced over roller 20 into a drying oven 22, preferably in the form of an air drying oven maintained at a temperature above ambient temperature, and preferably a temperature within the range of 150–550° F., to accelerate removal of the aqueous diluent and to set the impregnant in situ in the glass fiber bundle. Drying will occur within a relatively short period of time, generally within 0.1–30 minutes depending upon the temperature of drying.

Figure 2:
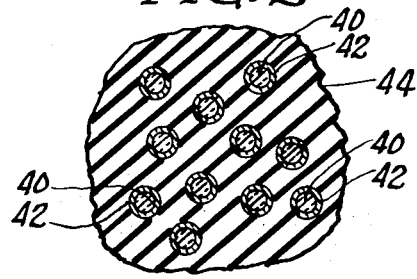
FIG. 2 is a cross sectional view of a bundle of glass fibers treated in accordance with the method illustrated in FIG. 1.

The resulting bundle is shown in cross section in FIG. 2 of the drawing. As can be seen from this figure, the bundle is formed of a plurality of glass fibers 40 which have an optional size coating 42 on the surfaces of the individual filaments. The impregnant 44 in the form of the solids from the treating composition of this invention completely penetrates the bundle and serves to separate the glass fibers each from the other to effect a unitary bundle structure.

Figure 3:
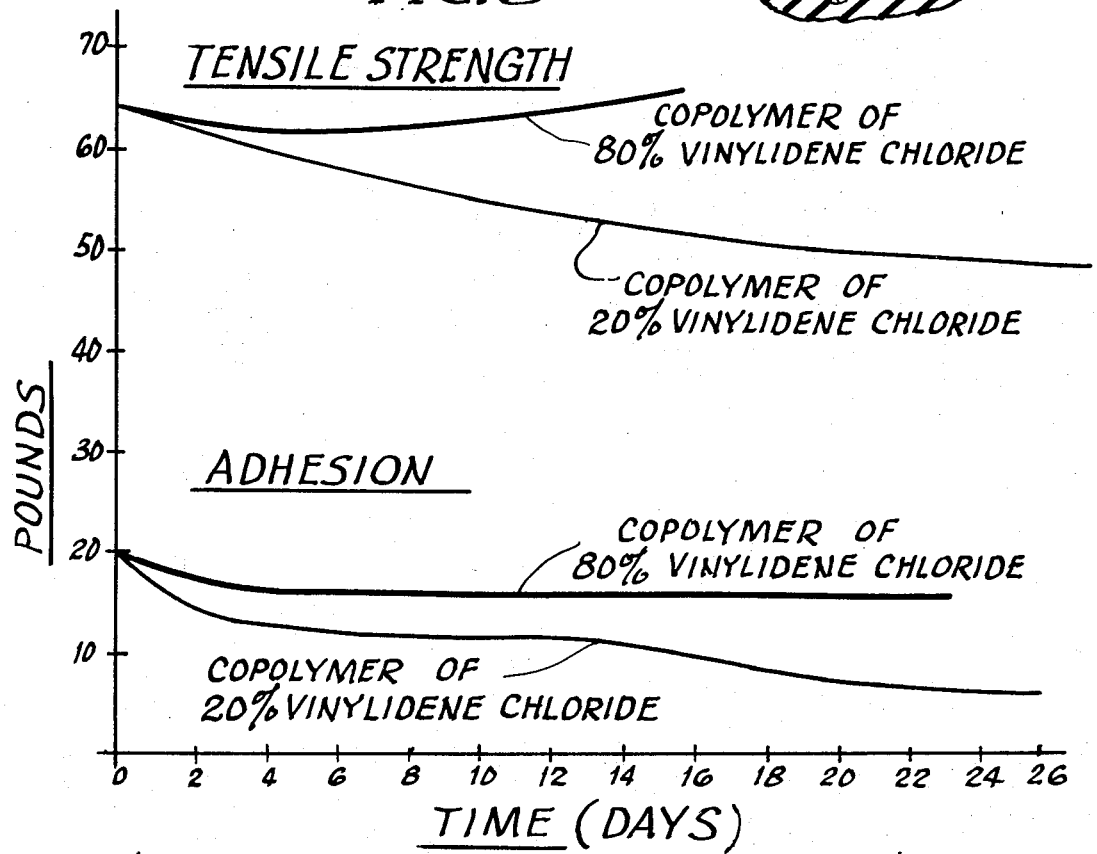
FIG. 3 is a graph illustrating the improved results obtained in accordance with the practice of this invention.

As indicated above, the use of vinylidene chloride copolymer in accordance with the practice of the present invention results in treated glass fibers having improved physical characteristics, including improved tensile strength and adhesion characteristics to elastomeric materials, particularly under conditions of high humidity. In addition, the composition of the present invention enables a high degree of loading of the impregnant in the glass fiber bundle, and thereby serves to maximize the protection afforded the individual glass fibers by the impregnant in the bundle. To illustrate the results obtained in accordance wtih the present invention, there is shown in FIG. 3 of the drawing a plot of the tensile strength and adhesion characteristics of a glass fiber bundle treated with a composition of the type described in Example 1 versus time, in days, during which the impregnated bundle is stored at a temperature of 125° F. and a relative humidity of 90%. The graph also incudes a plot of the same characteristics of a bundle of glass fibers treated in accordance with the practice of the aforementioned copending application in which use is made of a copolymer containing 80% vinyl chloride and only 20% vinylidene chloride. The data upon which the graph of FIG. 3 is based is obtained, in the case of tensile strength, by determining the amount of force required to cause breakage of the impregnated bundle, and in the case of adhesion, by molding a glass fiber bundle between two strips of an elastomeric material, and then determining the amount of force required to pull the bundle from between the strips of elastomeric material.

As can be seen in FIG. 3, the use of the copolymer with at least 60% vinylidene chloride in accordance with the practice of the present invention results in improved tensile strength and adhesion characteristics after storage over long periods of time at high humidity, as compared to the fiber bundles with the same type of composition containing a coplymer of 20% vinylidene chloride and 80% vinyl chloride as described in the aforementioned copending application.

Additional examples of this concept of the present invention may be illustrated by the following.

EXAMPLE 2

Part A

| | Parts by wt. |
|---|---|
| Distilled water | 732 |
| Sodium hydroxide | 1.5 |
| Resorcinol-formaldehyde resin (75% solids) | 60 |
| Formalin | 20 |

Part B

| | Parts by wt. |
|---|---|
| Rubber latex (Pliolite VP100) (butadiene-styrene-vinyl pyridine) terpolymer | 900 |
| Ammonium hydroxide | 80 |

Part C

| | Parts by wt. |
|---|---|
| Water | 200 |
| Ammonium hydroxide | 15 |
| Copolymer latex formed of a lubricant-modified copolymer of about 96% by weight vinylidene chloride and about 4% by weight butyl acrylate (Dewey & Almy latex Daran X66919M) | 350 |
| Vultex Wax Emulsion No. 5 (56% solids) | 100 |

EXAMPLE 3

Part A

| | Parts by wt. |
|---|---|
| Distilled water | 730 |
| Tetramethyl ammonium hydroxide | 1.5 |
| Resorcinol-formaldehyde latex (75% solids) | 48 |
| Formalin | 16 |

Part B

| | Parts by wt. |
|---|---|
| Butadiene-styrene-vinyl pyridine terpolymer (Gentac 107–42% solids) | 900 |
| Ammonium hydroxide | 80 |
| Water | 100 |
| Copolymer latex of 96% vinylidene chloride and 4% butyl acrylate (Dewey & Almy latex Daran 212–50% solids) | 350 |
| Vultex Wax Emulsion No. 9 (56% solids) | 100 |

EXAMPLE 4

Part A

| | Parts by wt. |
|---|---|
| Distilled water | 732 |
| Ammonium hydroxide | 1.5 |
| Resorcinol-formaldehyde (42% solids) | 48 |
| Formalin | 16 |

Part B

| | Parts by wt. |
|---|---|
| Butadiene-styrene-vinyl pyridine terpolymer (42% solids) | 900 |
| Ammonium hydroxide | 80 |
| Copolymer latex of 75% by wt. vinylidene chloride and 25% by wt. alkyl acrylate (Dow latex 4624–50% solids) | 350 |
| Vultex Wax Emulsion No. 9 (56% solids) | 50 |

Part A in each of the above examples is separately prepared by combining the ingredients and then aging for about 2–3 hours with alkali present in an amount sufficient to adjust the pH to between 7 and 7.5. The remainder of the ingredients are combined and the various parts are then mixed together. Aging of the entire mixture is not essential but beneficial results accrue, such as greater adhesion and stabilization of the mixture, after aging the entire mixture for from 10–24 hours before use to impregnate the glass fiber bundle.

The foregoing compositions are prepared in accordance with the procedure described in Example 1, and the resulting compositions can be applied by impregnation to glass fiber bundles in accordance with the procedure described in Example 1. In general, the impregnating compositions used in the practice of this invention are diluted with sufficient water to provide a composition having a solids content within the range of 10–50% by weight. Application of the impregnating composition can be made in an amount sufficient to impregnate with dry solids of 5–30% by weight of the glass fiber bundle, and preferably 10–25% by weight. It is desirable to achieve as full impregnation as possible into the bundles of glass fibers to more effectively separate the fibers each from the other with the impregnating material since the solids are effective to cushion the fibers and to protect the fibers from destruction by mutual abrasion. The deeper the penetration, the more effective is the bond between the bundles of glass fibers and the elastomeric material with which the bundles of glass fibers are combined in the subsequent manufacture of glass fiber-elastomeric products.

The elastomeric material with which the impregnated bundle of glass fibers is combined constitutes a continuous phase. The elastomer constituting the continuous phase may be selected from elastomers of the type incorporated into the impregnating composition, or the elastomeric material may differ therefrom. The elastomer constituting a continuous phase can be employed in the cured or uncured stage or in the vulcanized or unvulcanized stage. It is believed that the tie-in between the impregnated bundle of glass fibers and the elastomer constituting the continuous phase occurs primarily during cure or vulcanization of the elastomeric materials in combination with the impregnated bundles.

More complete protection for the individual glass fibers and more complete coordination of the glass fibers with the elastomeric material constituting the continuous phase can be achieved when impregnating compositions of the type described above are modified for use as a size composition for application to individual glass fiber filaments, preferably in forming. For this purpose, treating compositions of the type described above are further diluted with water to provide a solids content within the range of 5–30% by weight and are formulated to include a glass fiber anchoring agent. Representative of suitable anchoring agents which can be used in the practice of this invention are the organo silicons, their hydrolysis products and polymerization products (polysiloxane) of an organo silane having the formula:

$$Z_{(4-n)}SiR_n$$

wherein Z is a readily hydrolyzable group such as alkoxy having 1–4 carbon atoms (e.g., methoxy, ethoxy, propoxy, etc.) or halogen, such as chlorine, n is an integer from 1 to 3, and R is hydrogen or an organic group in which at least one R group is an alkyl group having 1–10 carbon atoms, such as methyl, ethyl, propyl, etc.; alkenyl having 1–10 carbon atoms, such as vinyl, allyl, etc.; cycloalkyl having 4–8 carbon atoms, such as cyclopentyl, cyclohexyl, etc., aryl having 6–10 carbon atoms, such as phenyl, naphthyl, benzyl, etc.; alkoxy alkyl, such as methyloxyethyl, etc.; alkenylcarbonyloxyalkyl, such as carbonylpropylmethoxy, etc.; as well as the amino, epoxy, mercapto and halogen derivatives of the foregoing groups.

Illustrative of suitable silanes are ethyltrichlorosilane, propyltrimethoxy silane, vinyl trichlorosilane, allyl triethoxy silane, cyclohexylethyltrimethoxy silane, phenyl trichloro silane, phenyl dimethoxy silane, methacryloxypropyltrimethoxy silane, gamma-aminopropyltriethoxy silane, beta-aminovinyldiethoxy silane, N-(gamma-triethoxysilylpropyl)propylamine, gamma-aminoallyltriethoxy silane, para-aminophenyltriethoxy silane, N-beta-aminoethyl)-gamma-aminopropyltrimethoxy silane, gamma-chloropropyltrichlorosilane, glycidoxy propyltrimethoxy silane, 3,4-epoxy-cyclohexylethyltrimethoxy silane, gamma-mercaptopropyltrimethoxy silane as well as a wide variety of others. It will be understood that the foregoing may be used in the form of the silane, the silanol or the polysiloxane formed by one or more of the foregoing materials.

Instead of organo silicon as described above, use can also be made of Werner complex compounds containing a carboxylato group coordinated with the trivalent nuclear chromic atom, and in which the carboxylato group may also contain an amino group or an epoxy group. Suitable Werner complex compounds include stearato chromic chloride, methacrylato chromic chloride, aminopropylato chromic chloride, glycine chromic complex or glycylato chromic chloride.

The anchoring agents of the type described above are normally employed in an amount within the range of 0.1 to 5% by weight of the treating composition.

A forming size embodying the concepts of this invention can be formulated as follows:

EXAMPLE 5

| | Parts by wt. |
|---|---|
| Resorcinol-formaldehyde resin | 2–10 |
| Butadiene-styrene-vinyl pyridine terpolymer | 20–60 |
| Copolymer latex containing at least 60% vinylidene chloride | 15–40 |
| Micro-crystalline paraffin wax | 5–30 |
| Anchoring agent | 0.1–3 |

EXAMPLE 6

| | Parts by wt. |
|---|---|
| Resorcinol-formaldehyde resin | 4–8 |
| Terpolymer | 35–50 |
| Copolymer latex containing at least 60% vinylidene chloride | 20–30 |
| Micro-crystalline paraffin wax | 10–20 |
| Anchoring agent | 0.1–3 |

The solids of the foregoing examples are formulated in the manner described in Examples 1–4 with the exception that the anchoring agent, such as gamma-aminopropyltriethoxy silane, is added to the system after hydrolyzation in aqueous medium, as by use of a quaternary ammonium hydroxide such as tetraethanol ammonium hydroxide or tetramethyl ammonium hydroxide and that the amount of water is increased for dilution of the solids to an amount within the range of 5–30% by weight. When applied as a size, it is possible to achieve a higher loading because of the individual coating of the glass fiber surfaces such that loading in the amount of 15–40% by weight of the sized glass fibers is possible.

The following is a specific example of the formulation to provide a size composition.

EXAMPLE 7

| | Parts by wt. |
|---|---|
| Resorcinol-formaldehyde resin (75% by wt. solids) | 60 |
| Formalin | 20 |
| Sodium hydroxide | 1.5 |
| Butadiene-styrene-vinyl pyridine terpolymer (42% solids) | 900 |
| Ammonium hydroxide | 95 |
| Copolymer latex of 96% by wt. vinylidene chloride and 4% by wt. butyl acrylate | 350 |
| Vultex Wax Emusion No. 5 (50% solids) | 200 |
| Gamma-aminopropyltriethoxy silane | 7 |

Figure 4:
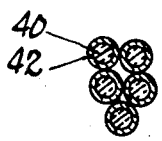
FIG. 4 is a cross sectional view of glass fibers individually coated with the composition of this invention in accordance with another embodiment thereof.

Size compositions of the type illustrated in Examples 5 and 6 can be applied in any of a variety of conventional methods. The resulting fibers are shown in FIG. 4 of the drawing as formed with a coating 42 of the size composition on the surfaces of the individual glass fibers 40.

When the glass fibers are sized in forming with a composition embodying the modification of this invention, the sized glass fibers remain sufficiently non-tacky for processing directly into yarns, strands, cords or fabrics for use in the combination with the continuous phase elastomer.

In fabricating the combinations of glass fibers, treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber-reinforced belts or in the manufacture of rubber tires reinforced with cords of glass fibers. The combinations of glass fibers and elastomeric materials are then processed in a conventional manner by molding and cure under heat and pressure or by vulcanization for advancement of the elastomeric materials to a cured or vulcanized state while in combination with the treated glass fibers whereby the bundles of glass fibers become strongly integrated with the elastomeric material in the glass fiber-elastomeric product.

It will be understood that the size compositions, represented by Examples 5, 6 and 7, may also be employed as impregnating compositions, preferably with a lesser dilution of aqueous medium. The anchoring agent will continue to operate to facilitate the bonded relationship or integration between the elastomeric material of the glass fiber treating composition and the glass fiber surfaces.

It will be apparent from the foregoing that we have provided a new and improved composition for use in the treatment of glass fibers and preferably bundles formed thereof to enhance their utilization with elastomeric materials, even under conditions of high humidity, in the manufacture of glass fiber-elastomeric products while still retaining the desired degree of non-tackiness to enable the treated glass fiber bundle to be processed in substantially the conventional manner into cords, yarns or fabrics or other arrangements desired for use in the final product.

It will be understood that the invention exists not only in the compositions described but also in the process in which the compositions are employed in the treatment of glass fibers as well as the treated or impregnated glass fiber products formed thereof.

It will be understood that changes may be made in the details of formulation and methods of preparation without departing from the spirit of the invention, especially as defined in the following claims.

I claim:

1. A glass fiber bundle comprising a plurality of glass fibers and an impregnant in the bundle, the impregnant comprising 2 to 10 parts by weight of a resorcinol-aldehyde resin, 20 to 60 parts by weight of a butadiene-styrene-vinyl pyridine terpolymer, 15 to 40 parts by weight of a copolymer formed of at least 60% by weight vinylidene chloride and at least one other ethylenically unsaturated monomer, and 5 to 30 parts by weight of an incompatible wax.

2. A glass fiber bundle as defined in claim 1 wherein the copolymer contains from 75 to 98% by weight vinylidene chloride.

3. A glass fiber bundle as defined in claim 1 wherein the copolymer is a copolymer formed of vinylidene chloride and at least one other vinylic monomer.

4. A glass fiber bundle as defined in claim 3 wherein the other vinylic monomer is selected from the group consisting of alkyl acrylates and methacrylates, vinyl chloride and acrylonitrile.

5. A glass fiber bundle as defined in claim 1 wherein the impregnant also includes an anchoring agent.

6. A glass fiber bundle as defined in claim 1 wherein the fiber bundle is in the form of a cord formed of a plurality of strands of glass fibers.

7. A glass fiber bundle as defined in claim 6 wherein the strands forming the cords are twisted and plied together.

8. A glass fiber bundle as defined in claim 1 wherein the fiber bundle is in the form of a woven or non-woven fabric formed of fibers in the form of cords.

9. Glass fibers having a thin coating thereon, said coating comprising 2 to 20 parts by weight of a resorcinol-aldehyde resin, 20 to 60 parts by weight of a butadiene-styrene-vinyl pyridine terpolymer, 15 to 40 parts by weight of a copolymer formed of at least 60% by weight vinylidene chloride and at least one other ethylenically unsaturated monomer, and 5–30 parts by weight of an incompatible wax.

10. Glass fibers as defined in claim 9 wherein the copolymer contains from 75 to 98% by weight vinylidene chloride.

11. Glass fibers as defined in claim 9 wherein the other ethylenically unsaturated monomer is selected from the group consisting of alkyl acrylates and methacrylates, vinyl chloride and acrylonitrile.

12. Glass fibers as defined in claim 9 wherein the coating includes an anchoring agent.

13. In a glass fiber-reinforced elastomeric product in which an elastomeric material constitutes a continuous phase in which the glass fibers are distributed, the improvement in the bonding relationship of the glass fibers with the elastomeric material comprising a coating on the glass fibers formed of 2 to 10 parts by weight of a resorcinol-aldehyde resin, 20 to 60 parts by weight of a butadiene-styrene-vinyl pyridine terpolymer, 15 to 40 parts by weight of a copolymer formed of at least 60% by weight vinylidene chloride and at least one other ethylenically unsaturated monomer, and 5 to 30 parts by weight of an incompatible wax.

14. A product as defined in claim 13 wherein the copolymer contains from 75 to 98% by weight vinylidene chloride.

15. A product as defined in claim 13 wherein the other ethylenically unsaturated monomer is selected from the group consisting of alkyl acrylates and methacrylates, vinyl chloride and acrylonitrile.

16. A product as defined in claim 13 which includes an anchoring agent in an amount within the range of 0.1 to 5.0% by weight.

17. A product as defined in claim 13 wherein the glass fibers are distributed in the elastomeric material in the form of individual filaments and the coating is a coating on the filaments.

18. A product as defined in claim 13 wherein the glass fibers are distributed in the elastomeric material in the form of bundles of glass fibers and the coating is an impregnant in the bundle.

19. A product as defined in claim 18 wherein the fiber bundle is in the form of a cord formed of a plurality of strands of glass fibers.

20. A product as defined in claim 19 wherein the strands forming the cords are twisted and plied together.

21. A product as defined in claim 18 wherein the fiber bundle is in the form of a woven or non-woven fabric formed of fibers in the form of cords.

References Cited
UNITED STATES PATENTS 3,567,671   3/1971   Janetos et al. ____ 117—126 GB WILLIAM D. MARTIN, Primary Examiner D. COHEN, Assistant Examiner U.S. Cl. X.R.

117—126 GB; 57—153, 140 G; 161—176